Aug. 2, 1960            A. GROUDAN            2,947,948
DIRECT COUPLED POLARITY INVERTER D.C. LEVEL ADJUSTER
Filed April 15, 1957
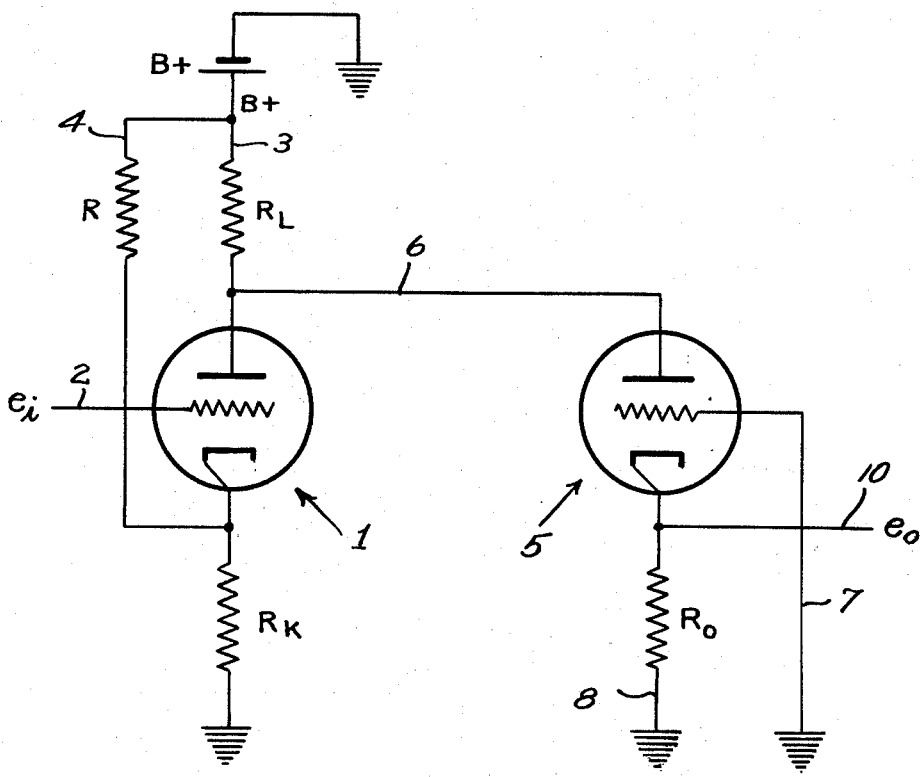
INVENTOR
ALAN GROUDAN
BY    *Victor N. Borst*
ATTORNEY United States Patent Office 2,947,948
Patented Aug. 2, 1960

2,947,948

DIRECT COUPLED POLARITY INVERTER D.C. LEVEL ADJUSTER

Alan Groudan, Brooklyn, N.Y., assignor to The Sperry Rand Corporation, Ford Instrument Company Division, Long Island City, N.Y., a corporation of Delaware Filed Apr. 15, 1957, Ser. No. 652,750

3 Claims. (Cl. 330—193)

This invention relates to polarity inverter and particularly to a tube circuit having direct coupling and operating on a positive supply voltage.

Phase inverters employing direct coupled circuits generally have had to employ a negative voltage supply so as to have the output voltage of low enough potential to apply to the grid of the following stage. Polarity inverters having non-direct coupled circuits employ condenser-diode type clamping to low voltages.

This invention contemplates a phase inverter circuit in which input and output tubes are direct coupled but which operates solely on a positive voltage supply thus eliminating the need for a negative voltage supply. Additionally, there is provision for biasing the input side of the circuit to assure a high peak voltage output without significantly raising the base or minimum level of the output voltage.

A more complete understanding of the invention may be gained on reading the following detailed description of one embodiment thereof in conjunction with the drawing which is a schematic diagram of the polarity inverter circuit.

According to the drawing a triode 1 is grid connected to input lead 2 on which a voltage $e_1$ is adapted to be placed. The triode 1 has a plate load resistor $R_L$ in plate lead 3 which is connected to a positive voltage source B+. A bleeder circuit 4 having a resistor R connects the positive voltage source to the cathode of the triode which has a grounded cathode resistor $R_k$.

Additionally, the polarity inverter circuit employs a second triode 5 the plate of which is connected by lead 6 to the plate lead 3 at a point between the plate and plate resistor of the triode 1. The grid of the triode 5 is grounded by means of ground connection 7 and its cathode is connected to ground leg lead 8 which includes a cathode resistor $R_o$. The triode 5 has a lead 10 for output voltage $e_o$ connected to the lead 8 between the cathode element and the cathode resistor $R_o$.

The operation of the circuit may be considered in two parts. A current from the bleeder resistor R flowing through the resistor $R_k$ places a bias $E_k$ on the triode 1. This bias should be midway between the maximum and minimum values of the input voltage so that tube cutoff is effected for a substantial portion of the input voltage cycle in order to assure maximum positive output of the circuit during the negative half of the cycle. When the input voltage is at a maximum the tube is full on and the plate voltage is very low. When the input voltage is at a minimum, the tube is cut off and the plate voltage is very high, since there is only a small voltage drop across the plate resistor $R_L$. It is, therefore, quite apparent that the variation of the voltage on the plate lead 6 must be opposite in polarity to the input voltage on the grid lead 2 of the tube 1. That is, when the voltage on the grid goes positive so as to make the tube more conductive the voltage across the load resistor $R_L$ is increased and hence the voltage on the lead 6 is made negative going. Since this lead supplies the plate voltage on the tube 5, the latter becomes less conducting and hence the voltage across the cathode resistor $R_o$ is reduced which causes a drop in voltage on the output lead 10. Accordingly, it is seen that as the voltage on the input lead 2 increases the voltage on the output lead 10 decreases and, of course, if the input voltage decreases the output voltage will increase for the same reason.

The voltage at the plate of the triode 1 is actually the plate supply voltage for the triode 5. Because the resistance of the cathode resistor $R_o$ is large, the output voltage of the circuit is very nearly approximated by cutoff voltage corresponding to the plate voltage of the triode 5 when the triode 1 is cut off. Circuit values are easily arranged so that the output voltage is in the order of a few volts when the plate voltage is low and the triode 1 is conducting and output voltage is high when the plate voltage is high and the triode 1 is cut off. Thus a negative pulse in the input is inverted in the output at cut off and a positive pulse in the input yields a low output pulse which is at most several volts above ground. The resulting D.C., polarity inverted pulse is obtained without the presence of a negative voltage supply.

It is understood that various departures may be made in the disclosed circuit arrangement without departing from the scope and principle of invention as defined in the appended claims.

What is claimed is:

1. A polarity inverter comprising a cathode, grid and plate vacuum tube having plate and cathode resistors connected to the corresponding elements thereof, a positive voltage supply connected to said plate resistor, the grid of said tube being adapted to receive an input voltage reference to ground, a triode, said triode having cathode, grid and plate electrodes, means for establishing the same potential levels on the plate electrodes of said first-mentioned vacuum tube and said triode, said means including a direct plate to plate connection, and the cathode of said triode having a cathode resistor, an output conductor connected between the cathode and cathode resistor of said triode, the voltage across the cathode resistor being referenced to ground and phased oppositely to the input voltage on the grid of said tube.

2. A polarity inverter as claimed in claim 1 wherein there is provided for said tube a bleeder circuit containing a bias adjusting resistor, the circuit being connected between the positive voltage supply and the cathode of said tube.

3. A polarity inverter as claimed in claim 2 wherein said triode has a grounded grid.

References Cited in the file of this patent

UNITED STATES PATENTS

| | | |
|---|---|---|
| 2,146,761 | Philpott | Feb. 14, 1939 |
| 2,313,122 | Brubaker | Mar. 9, 1943 |
| 2,505,024 | Wintle | Apr. 25, 1950 |
| 2,513,354 | Parker | July 4, 1950 |
| 2,554,469 | Minzner | May 22, 1951 |
| 2,641,626 | Gorevics | June 9, 1953 |

OTHER REFERENCES

Text, Valley and Wallman, Vacuum Tube Amplifiers, Radiation series 18, pp. 432 and 434, 1st. edition, October 1948.